(12) United States Patent
Jang et al.

(10) Patent No.: US 12,169,633 B2
(45) Date of Patent: Dec. 17, 2024

(54) SYSTEM AND METHOD OF PREPARING A SOLID STATE DRIVE FOR REUSE

(71) Applicant: Dell Products L.P., Round Rock, TX (US)

(72) Inventors: Young Hwan Jang, Singapore (SG); Vinoth John Paul Nedunchezhian, Singapore (SG); Hwai Bing Jonathan Yap, Singapore (SG)

(73) Assignee: Dell Products L.P., Round Rock, TX (US)

( * ) Notice: Subject to any disclaimer, the term of this patent is extended or adjusted under 35 U.S.C. 154(b) by 16 days.

(21) Appl. No.: 18/178,912

(22) Filed: Mar. 6, 2023

(65) Prior Publication Data

US 2024/0302971 A1  Sep. 12, 2024

(51) Int. Cl.
*G06F 3/06* (2006.01)

(52) U.S. Cl.
CPC ............ *G06F 3/0616* (2013.01); *G06F 3/064* (2013.01); *G06F 3/0679* (2013.01)

(58) Field of Classification Search
CPC ....... G06F 3/0616; G06F 3/064; G06F 3/0679
See application file for complete search history.

(56) References Cited

U.S. PATENT DOCUMENTS

| | | | |
|---|---|---|---|
| 11,061,814 B1* | 7/2021 | O'Brien, III | G06F 3/0616 |
| 2012/0303873 A1* | 11/2012 | Nguyen | G06F 12/0246 |
| | | | 711/E12.008 |
| 2016/0092114 A1* | 3/2016 | Zhang | G06F 3/0608 |
| | | | 711/102 |
| 2017/0199680 A1* | 7/2017 | Li | G06F 3/0616 |
| 2018/0076829 A1* | 3/2018 | Ueki | G06F 11/073 |
| 2019/0304562 A1* | 10/2019 | Cai | G11C 29/38 |
| 2020/0409568 A1* | 12/2020 | Gupta | G06F 3/0629 |
| 2022/0013191 A1* | 1/2022 | Bhatia | G11C 16/0483 |

\* cited by examiner

*Primary Examiner* — Eric T Loonan
(74) *Attorney, Agent, or Firm* — McDermott Will & Emery LLP

(57) ABSTRACT

In one or more embodiments, one or more systems, one or more methods, and/or one or more processes may retrieve, from a solid state drive (SSD), information that includes an original storage size of the SSD, a number of terabytes written, and a number of program/erase (P/E) cycles that occurred within the SSD; determine that a number of terabytes written is not above the threshold value of terabytes written; determine a threshold number of P/E cycles remaining associated with the SSD; determine that a number of P/E cycles remaining of the SSD is above the threshold number of P/E cycles remaining associated with the SSD; determine an overprovisioning percentage, which would produce a write amplification factor at or below a write amplification factor threshold, based at least on the number of P/E cycles remaining; determine configuration data for the SSD; and configure the SSD with the configuration data.

20 Claims, 5 Drawing Sheets

SYSTEM AND METHOD OF PREPARING A SOLID STATE DRIVE FOR REUSE

BACKGROUND

Field of the Disclosure

This disclosure relates generally to information handling systems and more particularly to preparing a solid state drive for reuse.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may retrieve, from a solid state drive (SSD), information that includes an original storage size of the SSD, a number of terabytes written, and a number of program/erase (P/E) cycles that occurred within the SSD; may determine a threshold value of terabytes written associated with the SSD; may determine that the number of terabytes written is not above the threshold value of terabytes written associated with the SSD; may determine a threshold number of P/E cycles remaining associated with the SSD; may determine that a number of P/E cycles remaining of the SSD is above the threshold number of P/E cycles remaining associated with the SSD; may determine an overprovisioning percentage, which would produce a write amplification factor at or below a write amplification factor threshold, based at least on the number of P/E cycles remaining; may determine configuration data for the SSD based at least on the over provisioning percentage; and may configure, by the information handling system, the SSD with the configuration data. In one or more embodiments, the write amplification factor threshold may be 1.1. In one or more embodiments, the one or more systems, the one or more methods, and/or the one or more processes may further, before configuring the SSD with the configuration data, receive a first usable logical block addressing (LBA) from the SSD and after configuring the SSD with the configuration data: receive a second usable LBA from the SSD and determine that the second usable LBA is less than the first usable LBA. In one or more embodiments, the SSD may include a controller that executes firmware. For example, configuring the SSD with the configuration data may include configuring the SSD with new firmware to be executed by the controller of the SSD. In one or more embodiments, the SSD may include at least one NAND flash memory medium to store data from a host information handling system. In one or more embodiments, determining the configuration data for the SSD based at least on the overprovisioning percentage may include determining the configuration data for the SSD based at least on the number of P/E cycles remaining of the SSD.

In one or more embodiments, a usable LBA provided to a host information handling system may be based at least on the number of P/E cycles remaining of the SSD. In one or more embodiments, before configuring the SSD with the configuration data, the SSD may include a first number of terabytes written. For example, after configuring the SSD with the configuration data, the SSD may include a second number of terabytes written. For instance, the second number of terabytes written may be based at least on the overprovisioning percentage and may be greater than the first number of terabytes written. In one or more embodiments, before retrieving, the information from the SSD, the one or more systems, the one or more methods, and/or the one or more processes may further wipe any data stored by an application or an operating system from the SSD. In one or more embodiments, the SSD may be mounted on a motherboard of another information handling system.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
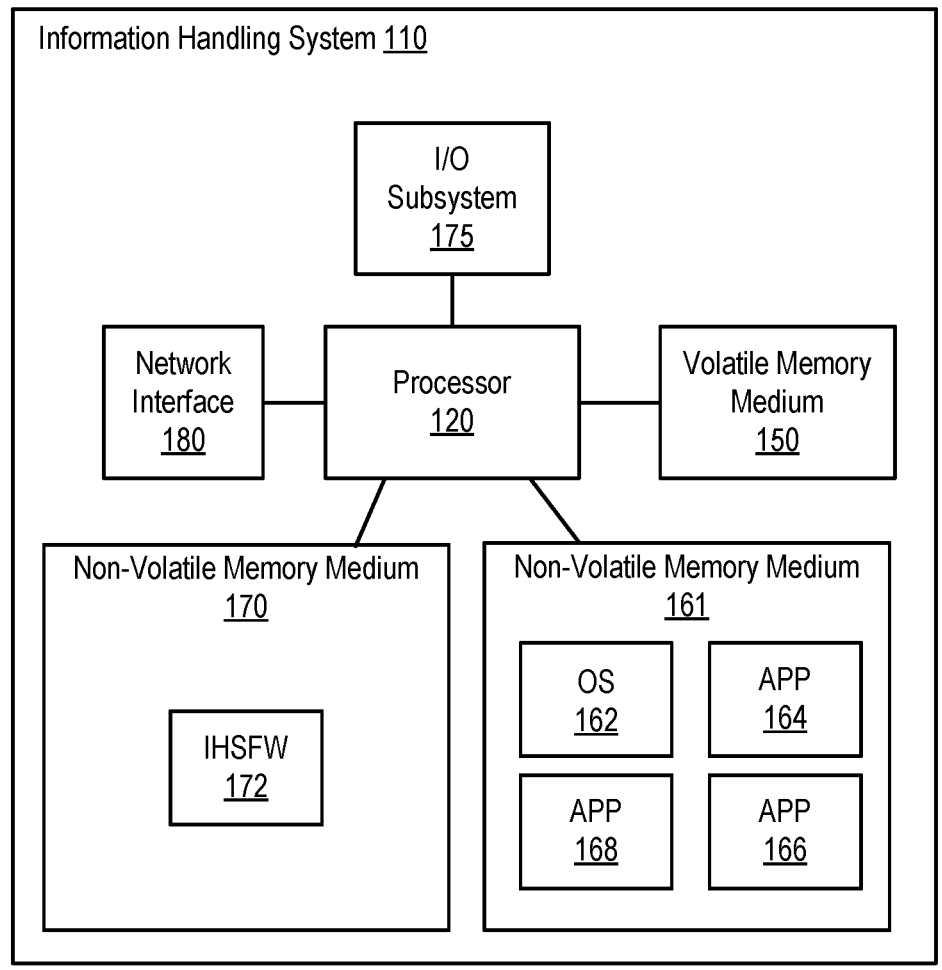
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a solid state drive (SSD) may be reused rather than recycled. For example, reuse may be better than recycling. In one or more embodiments, one or more systems, one or more methods, and/or one or more processes may reduce a write amplification factor (WAF) of an almost exhausted program and erase (P/E) cycle SSD to refurbish to a lower storage capacity. For example, a WAF may be a numerical value that represents an amount of data a SSD controller writes to a SSD in relation to an amount of data that an information handling system writes to the SSD. For instance, determining a WAF may include dividing the amount of data written the SSD writes to itself by the amount of data written by the information handling system to the SSD. As an example:

$$WAF = \frac{\text{Amount of data written to a SSD by the SSD}}{\text{Amount of data written to the SSD by a host}}.$$

In one instance, if an SSD writes two (2) gigabytes (GB) of data to itself and an information handling system writes 2 GB of data to the SSD, then a WAF would be 1.0. In another instance, if an SSD writes eight (8) GB of data to itself and an information handling system write 2 GB of data to the SSD, then a WAF would be 4.0. In this instance, the SSD wrote four times the amount of data to itself than was written by the information handling system.

In one or more embodiments, a SSD may be targeted for a number of terabytes written (TBW). For example, an average number or a "normal" number of TBW may be seventy-four (74) based at least on an assumption of forty (40) gigabytes (GB) written per day over five years. For instance, a targeted TBW for a refurbished SSD is seventy-four (74) TBW regardless of a storage capacity of the refurbished SSD. In accordance with the example above, a typical user write consumption over five years may be associated with a daily write consumption of forty (40) GB for three hundred and sixty-five (365) days per year over five years, which leads to 40 GB×5 years×365 days/year=73 TBW.

In one or more embodiments, a SSD may utilize one or more NAND flash memory media to store data. For example, a SSD that utilizes one or more NAND flash memory media to store data may be susceptible to write amplification because of P/E cycles. For instance, a SSD that utilizes one or more NAND flash memory media to store data may be susceptible to write amplification due to one or more processes and/or one or more methods utilized to write and erase data stored by the one or more NAND flash memory media.

In one or more embodiments, a high WAF may negatively affect storage performance and durability of a SSD. For example, a WAF of one (1) would be ideal; however, a WAF of one (1) may be challenging to maintain over time. For instance, the SSD may move data within itself to accommodate new data and/or updated data. As an example, to accommodate new data, one or more portions of the one or more NAND flash memory media may need to endure a P/E cycle. As another example, to accommodate updated data, one or more portions of the one or more NAND flash memory media may need to endure a P/E cycle.

In one or more embodiments, a SSD may divide its storage (e.g., its one or more NAND flash memory media) into blocks and then may divide the blocks into pages. For example, a page may include individual cells. In one or more embodiments, data of a SSD may be read and written at a page level; however, data may only be erased at a block level.

In one or more embodiments, data may not be overwritten in a SSD that include one or more one or more NAND flash memory media. In one example, if data is to be updated, original data is marked as invalid or stale, and updated data is written to (e.g., stored in) empty pages of the one or more NAND flash memory media. In another example, new data may be written to (e.g., stored in) empty pages of the one or more NAND flash memory media. For instance, an empty page is a page of the one or more NAND flash memory media that has never stored data or a page that has had its data erased.

In one or more embodiments, pages of the one or more NAND flash memory media with stale data may be erased before the pages can be used again to store valid data. For example, a page of the one or more NAND flash memory media may be erased at the block level. For instance, before a block of the one or more NAND flash memory media can be erased, all pages of the one or more NAND flash memory media that store usable data (e.g., not invalid data) may be moved to another block of the one or more NAND flash memory media.

In one or more embodiments, as an amount of stored data increases, stored data may need to be moved from one block of the one or more NAND flash memory media to another block of the one or more NAND flash memory media more frequently. For example, when stored data needs to be moved from one block of the one or more NAND flash memory media to another block of the one or more NAND flash memory media more frequently, write amplification may increase. For instance, additional data management may be necessary to accommodate new data and/or updated data and/or to move data around with the SSD.

In one or more embodiments, a SSD may continually move data to new blocks and may erase blocks with old or stale data. For example, processes, which continually move data to new blocks and erase blocks with old or stale data, may cause extra program/erase (P/E) cycles throughout a lifetime of the SSD. For instance, additional P/E cycles may cause further write amplification because an amount of data written to the SSD by the SSD is greater than an amount of data written to the SSD by the information handling system. In one or more embodiments, a controller of a SSD may manage P/E cycles. For example, the controller of the SSD may utilize a logical-to-physical mapping system. For instance, the logical-to-physical mapping system may be known as a logical block addressing (LBA) to manage data.

In one or more embodiments, when data is rewritten (e.g., moved from one block of the one or more NAND flash memory media to another block of the one or more NAND flash memory media), the controller of the SSD may write new data to a different location and subsequently may update the LBA with a new location associated with the new data. For example, invalid data may continue to reside in an old location until the invalid data is erased.

In one or more embodiments, the extra writes to the one or more NAND flash memory media of the SSD may cause a higher WAF. For example, a high write amplification associated with the SSD may inhibit performance and/or shorten a lifespan of the SSD. In one or more embodiments, a SSD may only support a finite number of P/E cycles before the one or more NAND flash memory media of the SSD begin to wear out and/or become unusable, which may decrease a lifespan of the SSD.

In one or more embodiments, negative effects of WAF may be prevented or mitigated. In one example, performance of a SSD may be improved and/or a lifespan of the SSD may be extended if a number of writes to the SSD are limited. In a second example, the SSD may be overprovisioned. For instance, extra NAND flash memory may be added to the SSD that a user cannot access. In one instance, overprovisioning may extend a SSD endurance. In another instance, overprovisioning may enable better data management within the SSD. In a third example, the controller of the SSD may utilize error correction codes, which may extend a lifespan of the SSD. For instance, bit errors may be with error correction code (ECC). As an example, a Hamming ECC may be utilized to correct NAND flash memory errors, which may provide single-bit error correction and two-bit error detection. In a fourth example, the controller of the SSD may utilize wear leveling. For instance, wear leveling may distribute P/E cycles across all blocks of the SSD, which may prevent overuse of any single block. In another example, the controller of the SSD may utilize a trim command. For instance, old data may be removed faster with a SSD trim command, which may consolidate free space on a drive and may enable garbage collection at a page level rather than a block level. In one or more embodiments, overprovisioning may include a process that provides additional storage capacity characteristically for data to be erased from an SSD.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a computer system. For instance, the computer system may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I2C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 161 and 170, an I/O subsystem 175, and a network interface 180. As illustrated, volatile memory medium 150, non-volatile memory media 161 and 170, I/O subsystem 175, and network interface 180 may be communicatively coupled to processor 120.

In one or more embodiments, one or more of volatile memory medium 150, non-volatile memory media 161 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 161 and 170, I/O subsystem 175, and network interface 180 may be communicatively coupled to processor 120 via one or more PCI-Express (PCIe) root complexes. In another example, one or more of I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 161 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 161, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 161, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 161 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 161. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

Figure 1B:
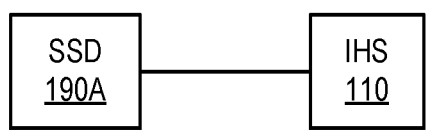
FIG. 1B illustrates an example of a solid state drive communicatively coupled to an information handling system, according to one or more embodiments.

Turning now to FIG. 1B, an example of a solid state drive communicatively coupled to an information handling system is illustrated, according to one or more embodiments. In one or more embodiments, a SSD 190A may be communicatively coupled to IHS 110. For example, SSD 190A may be communicatively coupled to processor 120. For instance, SSD 190A may external to IHS 110. In one or more embodiments, IHS 110 may receive one or more attributes associated with SSD 190A from SSD 190A. For example, the one or more attributes associated with SSD 190A may include a number of TBW, a number of P/E cycles, a storage capacity, a sequential read speed, a sequential write speed, a number of power cycles, a number of input/output operations per second (IOPS), and an access time, among others.

Figure 1C:
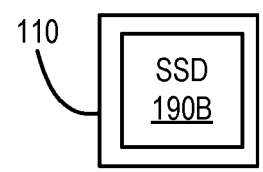
FIG. 1C illustrates another example of a solid state drive communicatively coupled to an information handling system, according to one or more embodiments.

Turning now to FIG. 1C, another example of a solid state drive communicatively coupled to an information handling system is illustrated, according to one or more embodiments. In one or more embodiments, a SSD 190B may be communicatively coupled to IHS 110. For example, SSD 190B may be communicatively coupled to processor 120. For instance, SSD 190B may internal to IHS 110 or may be slid into IHS 110. In one or more embodiments, IHS 110 may receive one or more attributes associated with SSD 190B from SSD 190B. For example, the one or more attributes associated with SSD 190B may include a number of TBW, a number of P/E cycles, a storage capacity, a sequential read speed, a sequential write speed, a number of power cycles, a number of IOPS, and an access time, among others.

Figure 1D:
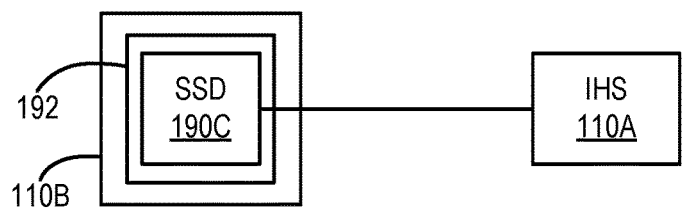
FIG. 1D illustrates an example of a solid state drive mounted to a printed circuit board of an information handling system and communicatively coupled to another information handling system, according to one or more embodiments.

Turning now to FIG. 1D, an example of a solid state drive mounted to a printed circuit board of an information handling system and communicatively coupled to another information handling system is illustrated, according to one or more embodiments. In one or more embodiments, a SSD 190C may be mounted to a printed circuit board (PCB) 192 of an IHS 110B. For example, SSD 190C may be soldered to PCB 192. For instance, PCB 192 may be a motherboard of IHS 110B. In one or more embodiments, SSD 190C may be communicatively coupled to IHS 110A. For example, SSD 190C may be communicatively coupled to processor 120 of IHS 110A. For instance, SSD 190C may external to IHS 110A. In one or more embodiments, IHS 110A may receive one or more attributes associated with SSD 190C from SSD 190C. For example, the one or more attributes associated with SSD 190C may include a number of TBW, a number of P/E cycles, a storage capacity, a sequential read speed, a sequential write speed, a number of power cycles, a number of IOPS, and an access time, among others.

In one or more embodiments, PCB 192 may be removed from IHS 110B before SSD 190C is communicatively coupled to IHS 110A. For example, PCB 192 may be removed from IHS 110B before SSD 190C is communicatively coupled to processor 120 of IHS 110A. In one or more embodiments, SSD 192C may not be easily removed from PCB 192. For example, one or more methods and/or one or more processes may be performed while SSD is mounted to PCB 192.

Figure 2A:
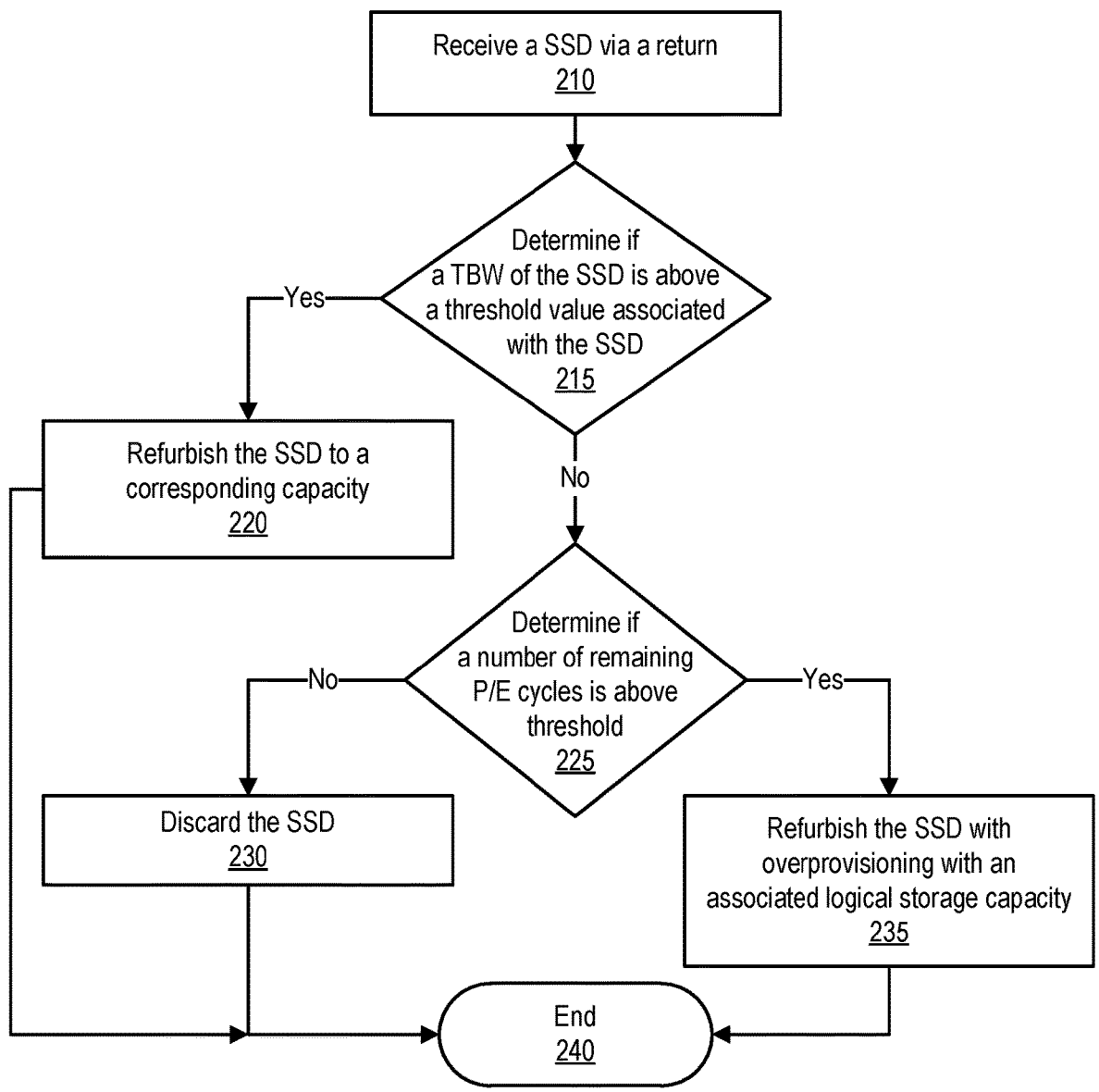
FIG. 2A illustrates an example of a method of refurbishing a solid state drive, according to one or more embodiments.
Figure 2B:
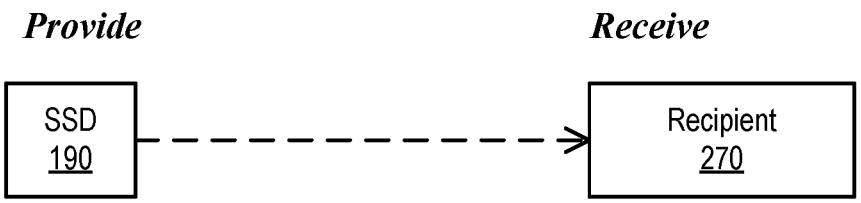
FIG. 2B illustrates an example of a solid state drive physically provided to a recipient, according to one or more embodiments.

Turning now to FIG. 2A, an example of a method of refurbishing a solid state drive is illustrated, according to one or more embodiments. At 210, a SSD may be received as a return. For example, a SSD 190 may be physically provided to a recipient 270, as illustrated in FIG. 2B. In one instance, recipient 270 may be or may include a manufacturer of SSDs. In a second instance, recipient 270 may be or may include a manufacturer of information handling systems. In another instance, recipient 270 may be or may include an e-waste recycler. In one or more embodiments, recipient 270 may receive SSD 190. For example, recipient 270 may receive SSD 190 as a returned item. In one or more embodiments, IHS 110B may be physically provided to a recipient 270. For example, recipient 270 may receive IHS 110B as a returned item. In one or more embodiments, PCB 192 may be physically provided to a recipient 270. For example, recipient 270 may receive PCB 192 as a returned item.

At 215, it may be determined if a TBW of the SSD is above a threshold value associated with the SSD. For example, IHS 110 may determine if a TBW of SSD 190 is above a specified value for SSD 190. If a TBW of the SSD is above a threshold value associated with the SSD, the SSD may be refurbished to a corresponding capacity, at 220. For example, SSD 190 may be refurbished to a corresponding capacity associated with SSD 190. In one or more embodiments, the method may proceed to 240, where the method may end. If a TBW of the SSD is not above a threshold value associated with the SSD, it may be determined if a number of remaining P/E cycles of the SSD is above a threshold number of P/E cycles, at 225. For example, IHS 110 may determine if a number of remaining P/E cycles of SSD 190 is above a threshold number of P/E cycles.

In one or more embodiments, determining if a number of remaining P/E cycles of the SSD is above a threshold number of P/E cycles may include receiving information associated with the SSD from the SSD. For example, the information associated with the SSD may include one or more of an original storage size of the SSD, a number of P/E cycles, and a number of P/E cycles remaining. In one or more embodiments, if the information associated with the SSD does not include a number of P/E cycles remaining, an original number of P/E cycles (e.g., a number of P/E cycles when the SSD was new) may be retrieved from a register (e.g., a listing, a catalog, etc.) and/or a database, among others. For example, the number of P/E cycles remaining may be determined via subtracting the number of P/E cycles from the original number of P/E cycles.

In one or more embodiments, the threshold number of P/E cycles associated with the SSD may be based at least on an original storage size of the SSD. For example, the threshold number of P/E cycles associated with the SSD may be retrieved from a register (e.g., a listing, a catalog, etc.) and/or a database, among other, based at least on the original storage size of the SSD. In one instance, when the original storage size of the SSD is 256 GB, the threshold number of P/E cycles associated with the SSD may be three hundred and twenty (320) P/E cycles. In a second instance, when the original storage size of the SSD is 512 GB, the threshold number of P/E cycles associated with the SSD may be one hundred and sixty (160) P/E cycles. In another instance, when the original storage size of the SSD is 1024 GB, the threshold number of P/E cycles associated with the SSD may be eighty (80) P/E cycles.

If the number of remaining P/E cycles of the SSD is not above the threshold number of P/E cycles, the SSD may be discarded, at 230. For example, discarding the SSD may include recycling the SSD, recycling at least a portion of the SSD, demolishing the SSD, shredding the SSD, or destroying the SSD, among others. In one or more embodiments, the method may proceed to 240, where the method may end. If the number of remaining P/E cycles of the SSD is above the threshold number of P/E cycles, the SSD may be refurbished with overprovisioning with an associated logical storage capacity, at 235. For example, IHS 110 may refurbish SSD 190 with overprovisioning with an associated logical storage capacity.

Figure 3A:
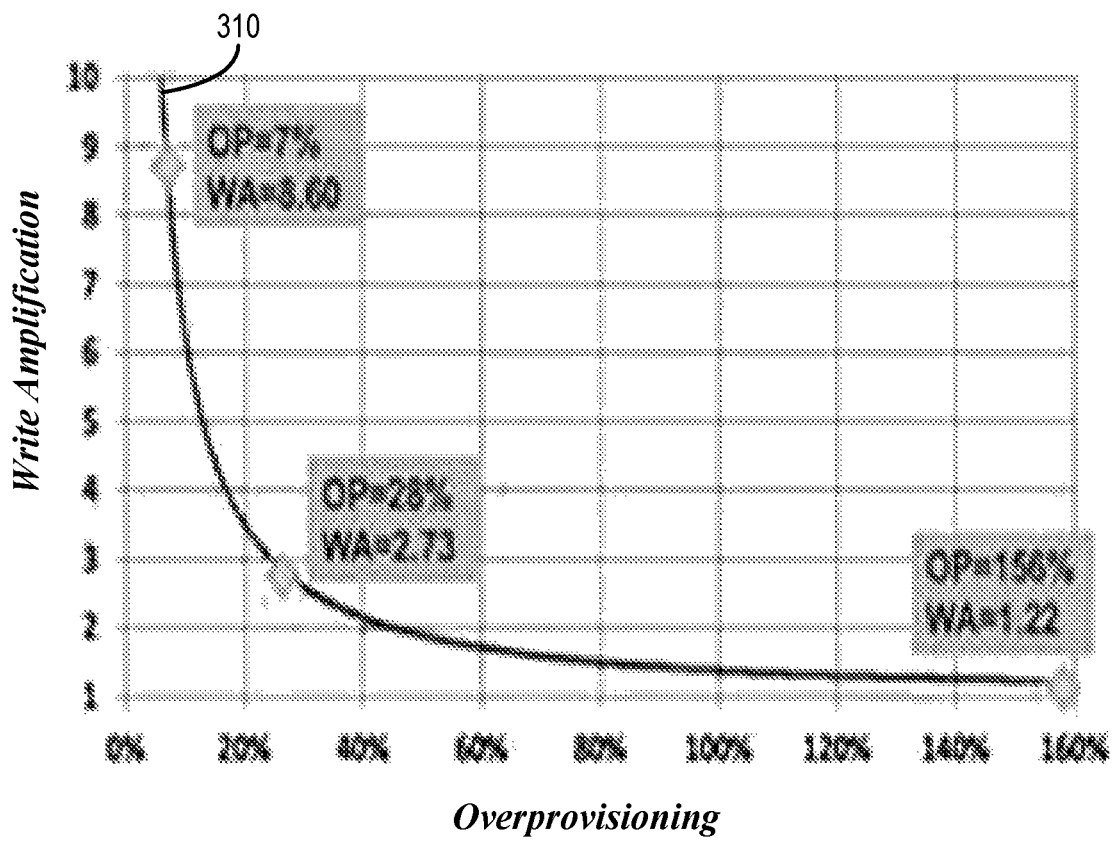
FIG. 3A illustrates an example of a plot that shows percentages of overprovisioning versus write amplification values, according to one or more embodiments.

In one or more embodiments, a percentage of overprovisioning may be associated with a write amplification (WA) value. For example, it may be beneficial to minimize a WA value when refurbishing the SSD. For instance, when the SSD has a lower WA value, the SSD may store data faster and may overwrite data faster. In one or more embodiments, a WA value associated with the SSD may be inversely proportional to a percentage of overprovisioning associated with the SSD. For example, a plot 310 shows percentages of overprovisioning versus WA values, as illustrated in FIG. 3A. In one instance, a percentage of overprovisioning of 7% of the SSD may be associated with a WA value of 8.6. In a second instance, a percentage of overprovisioning of 28% of the SSD may be associated with a WA value of 2.73. In another instance, a percentage of overprovisioning of 156% of the SSD may be associated with a WA value of 1.22. In one or more embodiments, a target WAF may be beneficial. For example, a WAF of 1.1 or less may be beneficial.

Figure 3B:
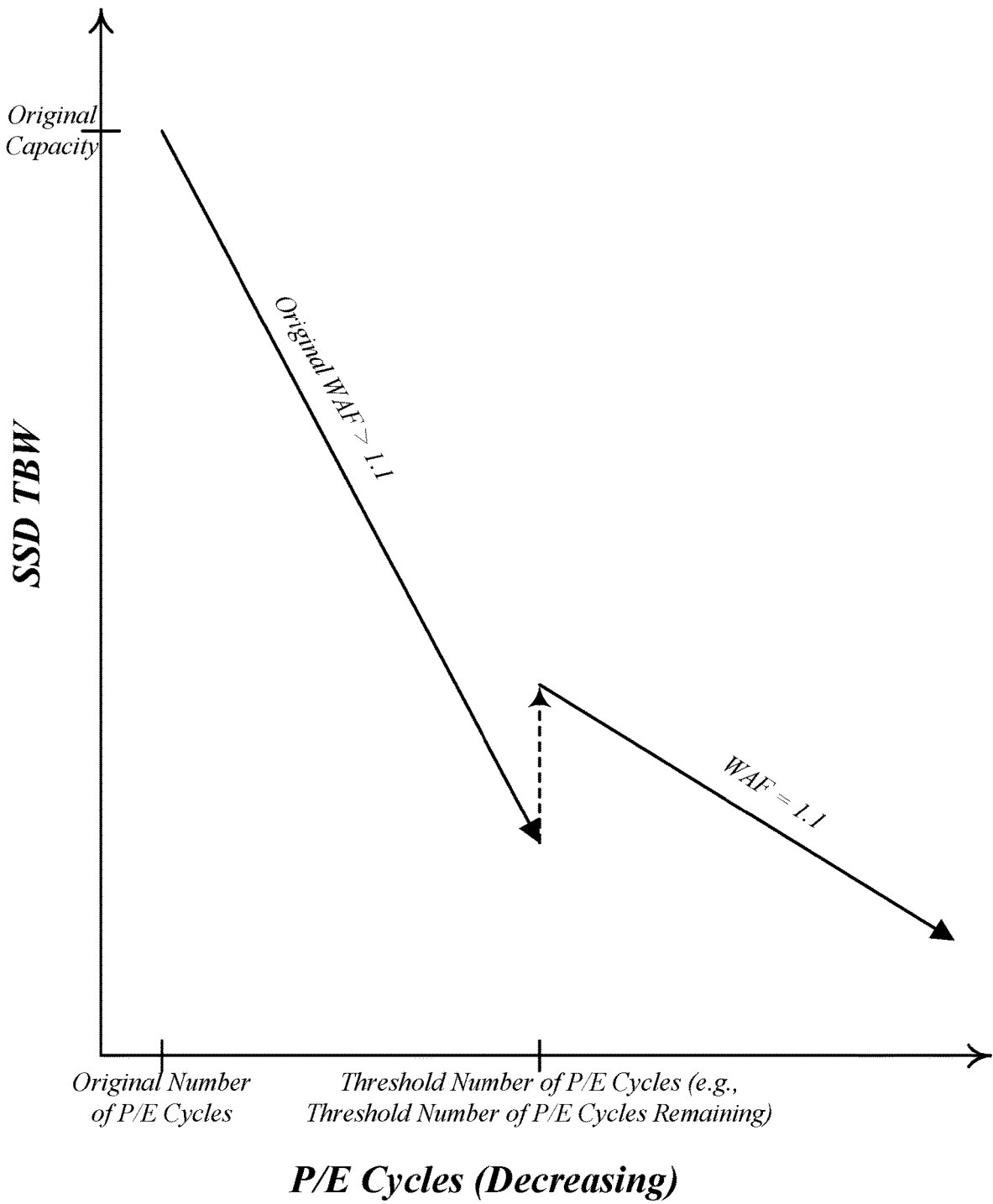
FIG. 3B illustrates an example of a solid state drive associated with a write amplification factor greater than 1.1, according to one or more embodiments.
Figure 3C:
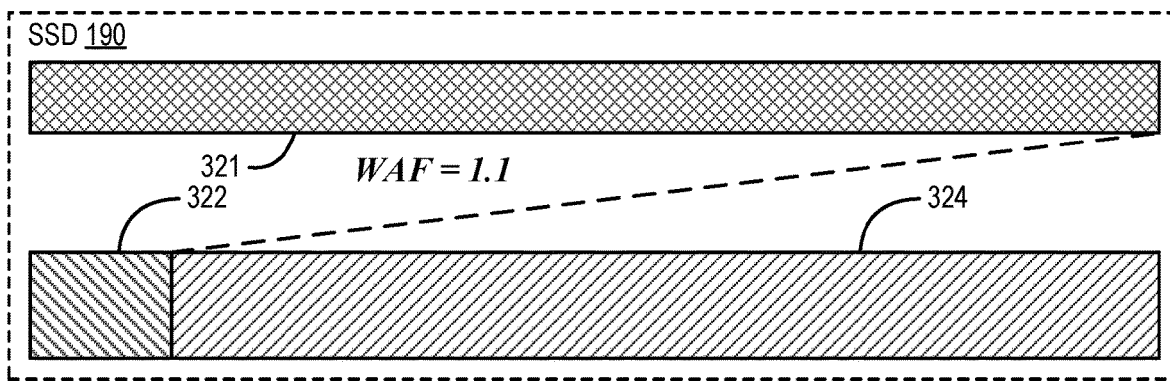
FIG. 3C illustrates an example of a solid state drive that had an original storage capacity, according to one or more embodiments.

As shown in FIG. 3B, SSD 190 may be originally associated with a WAF greater than 1.1. For example, SSD 190 may be have originally been associated with a WAF of 3.0. For instance, SSD 190 may have been associated with an original capacity. If the threshold number of P/E cycles (e.g., the threshold number of P/E cycles remaining) has not been reached, SSD 190 may be refurbished such that a WAF associated with SSD 190 is 1.1. For example, SSD 190 may have had an original storage capacity 321, as illustrated in FIG. 3C. In one instance, original storage capacity 321 may be 256 GB. In a second instance, original storage capacity 321 may be 512 GB. In a third instance, original storage capacity 321 may be 1024 GB.

In the first instance, original storage capacity 321 may be reduced to a storage capacity 322, such as 32 GB, which may be a usable LBA that may be presented to IHS 110. As an example, an overprovisioning 324 may be 700%, and a TBW associated with SSD 190 may be revived to 74TBW. In the second instance, original storage capacity 322, such as 32 GB, which may be a usable LBA that may be presented to IHS 110. As an example, overprovisioning 324 may be 1500%, and a TBW associated with SSD 190 may be revived to 74TBW. In the third instance, original storage capacity 321 may be reduced to storage capacity 322, such as 64 GB, which may be a usable LBA that may be presented to IHS 110. As an example, overprovisioning 324 may be 1500%, and a TBW associated with SSD 190 may be revived to 74TBW. Referring back to FIG. 2, the method may proceed to 240, where the method may end, according to one or more embodiments.

Figure 4:
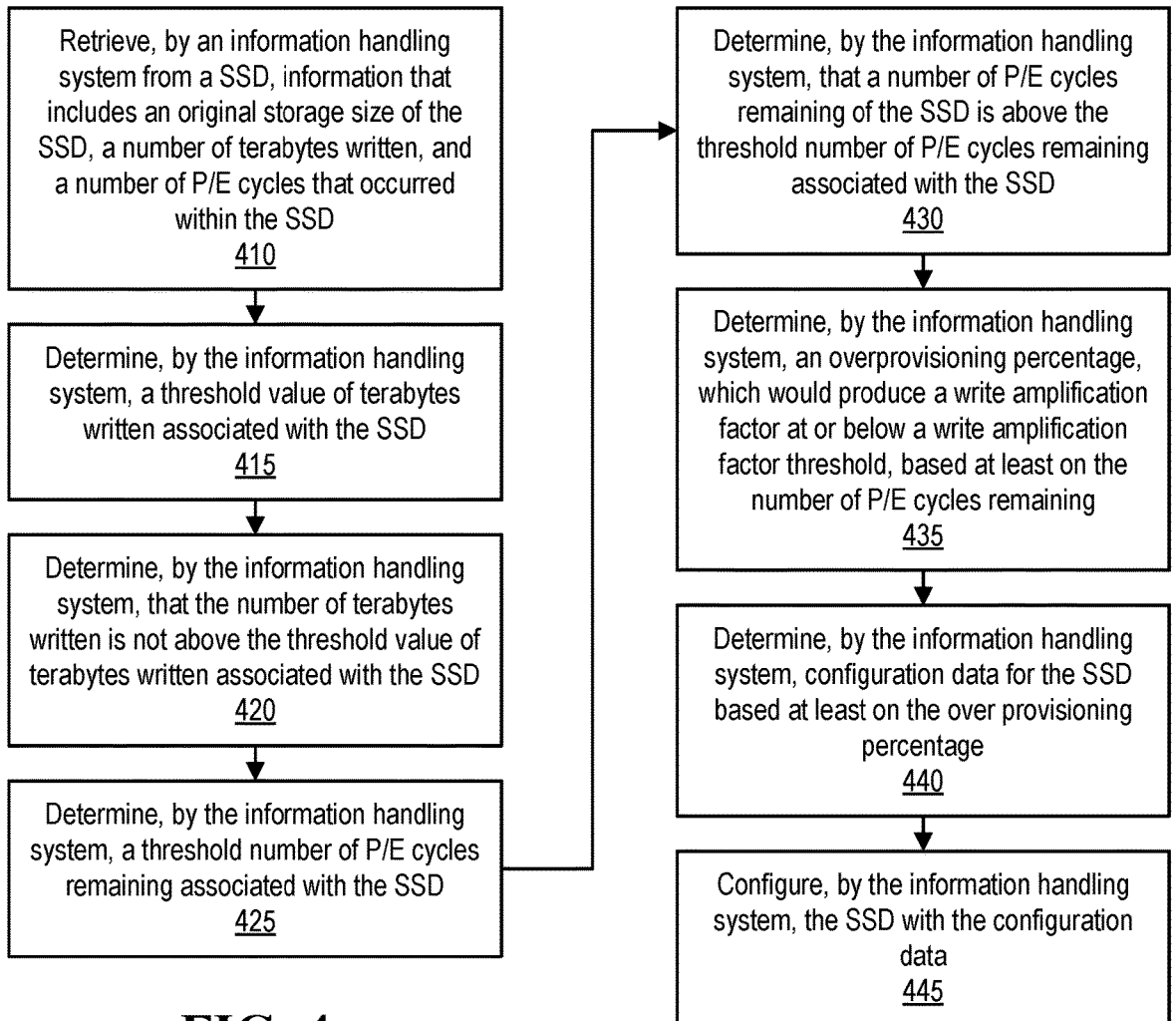
FIG. 4 illustrates another example of a method of refurbishing a solid state drive, according to one or more embodiments.

Turning now to FIG. 4, another example of a method of refurbishing a solid state drive is illustrated, according to one or more embodiments. At 410, information that includes an original storage size of a SSD, a number of terabytes written, and a number of P/E cycles that occurred within the SSD may be retrieved from the SSD. For example, IHS 110 may retrieve, from SSD 190, information that includes an original storage size of the SSD, a number of terabytes written, and a number of P/E cycles that occurred within SSD 190. At 415, a threshold value of terabytes written associated with the SSD may be determined. For example, IHS 110 may determined a threshold value of terabytes written associated with SSD 190;

At 420, it may be determined that the number of terabytes written is not above the threshold value of terabytes written associated with the SSD. For example, IHS 110 may determine that the number of terabytes written is not above the threshold value of terabytes written associated with SSD 190. At 425, a threshold number of P/E cycles remaining associated with the SSD may be determined. For example, IHS 110 may determine a threshold number of P/E cycles remaining associated with SSD 190. At 430, it may be determined that a number of P/E cycles remaining of the SSD is above the threshold number of P/E cycles remaining associated with the SSD. For example, IHS 110 may determine that a number of P/E cycles remaining of the SSD is above the threshold number of P/E cycles remaining associated with SSD 190.

At 435, an overprovisioning percentage, which would produce a write amplification factor at or below a write amplification factor threshold, may be determined based at least on the number of P/E cycles remaining. For example, IHS 110 may determine an overprovisioning percentage, which would produce a write amplification factor at or below a write amplification factor threshold, based at least on the number of P/E cycles remaining. At 440, configuration data for the SSD may be determined based at least on the over provisioning percentage. For example, IHS 110 may determine configuration data for SSD 190 based at least on the over provisioning percentage. At 445, the SSD may be configured with the configuration data. For example, IHS 110 may configure SSD 190 with the configuration data. In one or more embodiments, the SSD may be configured with new firmware. For example, IHS 110 may provide new firmware to SSD 190. For instance, the controller of SSD 190 may execute the new firmware and/or utilize the configuration data to implement one or more systems, one or more methods, and/or one or more processes described herein.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor; and
   a memory medium, coupled to the at least one processor, that stores instructions executable by the at least one processor, which when executed by the at least one processor, cause the information handling system to:
   retrieve, from a solid state drive (SSD) communicatively coupled to the at least one processor, information that includes an original storage size of the SSD, a number of terabytes written, and a number of program erase (P/E) cycles that occurred within the SSD;
   determine a threshold value of terabytes written associated with the SSD;
   determine that the number of terabytes written is not above the threshold value of terabytes written associated with the SSD;
   determine a threshold number of P/E cycles remaining associated with the SSD;
   determine that a number of P/E cycles remaining of the SSD is above the threshold number of P/E cycles remaining associated with the SSD;
   determine an overprovisioning percentage, which would produce a write amplification factor at or below a write amplification factor threshold, based at least on the number of P/E cycles remaining;
   determine configuration data for the SSD based at least on the overprovisioning percentage, the configuration data indicating, a storage portion of the SSD that is accessible to a user and an overprovisioned portion of the SSD that is inaccessible to the user, wherein the storage portion of the SSD and the overprovisioning portion of the SSD are sized based on the overprovisioning percentage; and
   configure, based on the configuration data, the SSD, including partitioning, based on the configuration data, the SSD to include the storage portion and the overprovisioned portion.

2. The information handling system of claim 1, wherein the write amplification factor threshold is 1.1.

3. The information handling system of claim 1, wherein the instructions further cause the information handling system to:
   before configuring the SSD with the configuration data, receive a first usable logical block addressing (LBA) from the SSD;
   after configuring the SSD with the configuration data: receive a second usable LBA from the SSD.

4. The information handling system of claim 1,
   wherein the SSD includes a controller that executes firmware; and
   wherein the configuring the SSD with the configuration data includes configuring the SSD with new firmware to be executed by the controller of the SSD.

5. The information handling system of claim 1, wherein the SSD includes at least one NAND flash memory medium to store data from a host information handling system.

6. The information handling system of claim 1, wherein, to determine the configuration data for the SSD based at least on the overprovisioning percentage, the instructions further cause the information handling system to determine the configuration data for the SSD based at least on the number of P/E cycles remaining of the SSD.

7. The information handling system of claim 6, wherein a usable logical block addressing (LBA) provided to a host information handling system is based at least on the number of P/E cycles remaining of the SSD.

8. The information handling system of claim 1,
   wherein before the configuring the SSD with the configuration data, the SSD includes a first number of terabytes written;
   wherein after the configuring the SSD with the configuration data, the SSD includes a second number of terabytes written; and
   wherein the second number of terabytes written is based at least on the overprovisioning percentage and is greater than the first number of terabytes written.

9. The information handling system of claim 1, wherein the instructions further cause the information handling system to, before retrieving, the information from the SSD, wiping any data stored by an application or an operating system from the SSD.

10. The information handling system of claim 1, wherein the SSD is mounted on a motherboard of another information handling system.

11. A method, comprising:
   retrieving, by an information handling system from a solid state drive (SSD), information that includes an original storage size of the SSD, a number of terabytes written, and a number of program erase (P/E) cycles that occurred within the SSD;
   determining, by the information handling system, a threshold value of terabytes written associated with the SSD;
   determining, by the information handling system, that the number of terabytes written is not above the threshold value of terabytes written associated with the SSD;
   determining, by the information handling system, a threshold number of P/E cycles remaining associated with the SSD;
   determining, by the information handling system, that a number of P/E cycles remaining of the SSD is above the threshold number of P/E cycles remaining associated with the SSD;
   determining, by the information handling system, an overprovisioning percentage, which would produce a write amplification factor at or below a write amplification factor threshold, based at least on the number of P/E cycles remaining;

determining, by the information handling system, configuration data for the SSD based at least on the overprovisioning percentage, the configuration data indicating, a storage portion of the SSD that is accessible to a user and an overprovisioned portion of the SSD that is inaccessible to the user, wherein the storage portion of the SSD and the overprovisioning portion of the SSD are sized based on the overprovisioning percentage; and configuring, by the information handling system and based on the configuration data, the SSD, including partitioning, based on the configuration data, the SSD to include the storage portion and the overprovisioned portion.

12. The method of claim 11, wherein the write amplification factor threshold is 1.1.

13. The method of claim 11, further comprising:
before the configuring the SSD with the configuration data, receiving a first usable logical block addressing (LBA) from the SSD; and
after the configuring the SSD with the configuration data:
receiving a second usable LBA from the SSD.

14. The method of claim 11,
wherein the SSD includes a controller that executes firmware; and
wherein the configuring the SSD with the configuration data includes configuring the SSD with new firmware to be executed by the controller of the SSD.

15. The method of claim 11, wherein the SSD includes at least one NAND flash memory medium to store data from a host information handling system.

16. The method of claim 11, wherein the determining the configuration data for the SSD based at least on the overprovisioning percentage includes determining the configuration data for the SSD based at least on the number of P/E cycles remaining of the SSD.

17. The method of claim 16, wherein a usable logical block addressing (LBA) provided to a host information handling system is based at least on the number of P/E cycles remaining of the SSD.

18. The method of claim 11,
wherein before the configuring the SSD with the configuration data, the SSD includes a first number of terabytes written;
wherein after the configuring the SSD with the configuration data, the SSD includes a second number of terabytes written; and
wherein the second number of terabytes written is based at least on the overprovisioning percentage and is greater than the first number of terabytes written.

19. The method of claim 11, before the retrieving, the information from the SSD, wiping any data stored by an application or an operating system from the SSD.

20. The method of claim 11, wherein the SSD is mounted on a motherboard of another information handling system.

* * * * *